United States Patent
Tanaka et al.

(10) Patent No.: US 9,216,664 B2
(45) Date of Patent: Dec. 22, 2015

(54) VEHICLE AND VEHICLE CONTROL METHOD

(71) Applicant: TOYOTA JIDOSHA KABUSHIKI KAISHA, Toyota (JP)

(72) Inventors: Nobuyuki Tanaka, Toyota (JP); Shoji Nagata, Anjo (JP)

(73) Assignees: TOYOTA JIDOSHA KABUSHIKI KAISHA, Toyota-Shi (JP); AISIN AW CO. LTD, Anjo-Shi (JP)

( * ) Notice: Subject to any disclaimer, the term of this patent is extended or adjusted under 35 U.S.C. 154(b) by 0 days.

(21) Appl. No.: 14/356,665

(22) PCT Filed: Nov. 7, 2012

(86) PCT No.: PCT/IB2012/002250
§ 371 (c)(1),
(2) Date: May 7, 2014

(87) PCT Pub. No.: WO2013/068808
PCT Pub. Date: May 16, 2013

(65) Prior Publication Data
US 2014/0288756 A1  Sep. 25, 2014

(30) Foreign Application Priority Data

Nov. 10, 2011 (JP) .................................. 2011-246504

(51) Int. Cl.
| | |
|---|---|
| *B60W 10/08* | (2006.01) |
| *B60W 10/06* | (2006.01) |
| *B60K 6/445* | (2007.10) |
| *A01B 61/02* | (2006.01) |
| *B60L 15/20* | (2006.01) |
| *B60K 6/34* | (2007.10) |

(Continued)

(52) U.S. Cl.
CPC . *B60L 15/20* (2013.01); *B60K 6/34* (2013.01); *B60W 10/08* (2013.01); *B60W 10/105* (2013.01); *B60W 20/50* (2013.01); *B60W 20/00* (2013.01); *B60W 2720/10* (2013.01); *B60Y 2300/68* (2013.01); *B60Y 2306/13* (2013.01); *Y02T 10/7258* (2013.01); *Y10S 903/903* (2013.01)

(58) Field of Classification Search
None
See application file for complete search history.

(56) References Cited

U.S. PATENT DOCUMENTS 7,828,093 B2 * 11/2010 Hanada et al. ........... 180/65.265
8,688,300 B2 *  4/2014 Takahashi et al. ............... 701/22

(Continued)

FOREIGN PATENT DOCUMENTS

| JP | 2005-117756 A | 4/2005 |
|---|---|---|
| JP | 2007-137373 A | 6/2007 |

(Continued)

*Primary Examiner* — Thomas Tarcza
*Assistant Examiner* — Timothy Nesley
(74) *Attorney, Agent, or Firm* — Kenyon & Kenyon LLP

(57) ABSTRACT

In a hybrid vehicle including an engine, a motor, a generator, and a battery that is electrically connected to the motor and the generator, an ECU performs "battery-less travel control" enabling the vehicle to travel when a fault occurs in the battery by disconnecting the battery from an electrical system including the motor and the generator and driving the motor using power that is generated by the generator using the power of the engine. When the battery-less travel control is underway and a vehicle speed V exceeds a vehicle speed limit Vsh, the ECU implements a vehicle speed limitation. As a result, a control mode of the motor is less likely to shift to a rectangular control mode during the battery-less travel control.

7 Claims, 10 Drawing Sheets

(51) Int. Cl.
*B60W 10/105* (2012.01)
*B60W 20/00* (2006.01)

(56) References Cited

U.S. PATENT DOCUMENTS

| | | | |
|---|---|---|---|
| 8,909,397 B2 * | 12/2014 | Aridome et al. | 701/22 |
| 2012/0028749 A1 * | 2/2012 | Kawasaki et al. | 475/211 |
| 2013/0059182 A1 * | 3/2013 | Komatsu et al. | 429/93 |
| 2013/0297106 A1 * | 11/2013 | Yamazaki et al. | 701/22 |
| 2014/0011632 A1 * | 1/2014 | Ito et al. | 477/5 |

FOREIGN PATENT DOCUMENTS

| | | |
|---|---|---|
| JP | 2007-168503 A | 7/2007 |
| JP | 2007-196733 A | 8/2007 |
| JP | 2008-072868 A | 3/2008 |
| JP | 2010-200582 A | 9/2010 |

* cited by examiner

FIG.4

| CONTROL METHOD | SINE WAVE PWM | OVERMODULATION PWM | RECTANGULAR WAVE (1 PULSE) |
|---|---|---|---|
| | PWM CONTROL MODE | | RECTANGULAR CONTROL MODE |
| WAVEFORM OF INVERTER OUTPUT VOLTAGE | BASIC WAVE COMPONENT | BASIC WAVE COMPONENT | BASIC WAVE COMPONENT |
| MODULATION PERCENTAGE | 0 TO APPROX. 0.61 | MAXIMUM VALUE OF SINE WAVE PWM TO 0.78 | 0.78 |
| CHARACTERISTIC | SMALL TORQUE VARIATION | INCREASED OUTPUT IN MEDIUM SPEED REGION | INCREASED OUTPUT IN HIGH SPEED REGION |

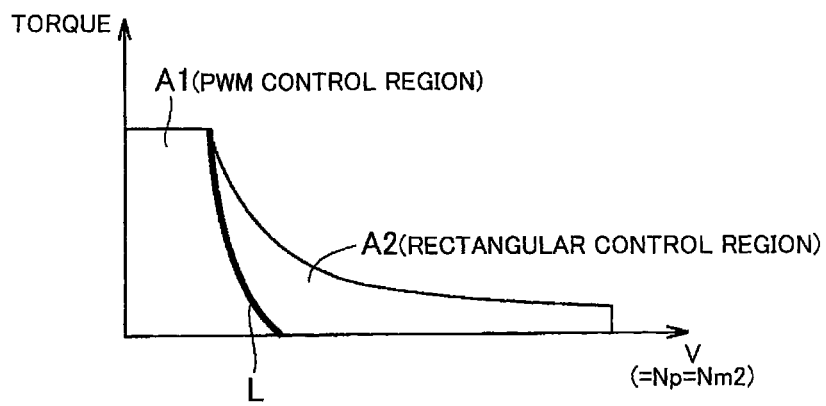

FIG.5

VEHICLE AND VEHICLE CONTROL METHOD

CROSS-REFERENCE TO RELATED APPLICATIONS

This is a national phase application based on the PCT International Patent Application No. PCT/IB2012/002250 filed Nov. 7, 2012, claiming priority to Japanese application No. 2011-246504 filed Nov. 10, 2011, the entire contents of both of which are incorporated herein by reference.

BACKGROUND OF THE INVENTION

1. Field of the Invention

The invention relates to a vehicle, and more particularly to a vehicle that travels using electric power from at least one of an engine and a motor.

2. Description of Related Art

Recently, hybrid vehicles that travel using drive power from at least one of an engine and a motor are becoming more widespread. A hybrid vehicle may include a generator provided separately to the motor in order to generate electric power using the power of the engine.

Japanese Patent Application Publication No. 2007-196733 (JP-2007-196733 A) discloses a technique employed in a hybrid vehicle including an engine, a motor, and a generator for performing control (also referred to as hereafter as "battery-less travel control"). The hybrid vehicle disconnects the battery from an electrical system including the motor and the generator and drives the motor using power that is generated by the generator using the power of the engine to travel the vehicle when an abnormality occurs in a battery that stores electric power for driving the motor.

Incidentally, a hybrid vehicle is installed with an inverter for driving the motor. Principal methods of controlling the inverter include a pulse width modulation (also referred to as "PWM" hereafter) control method and a rectangular wave voltage control (also referred to simply as "rectangular control" hereafter) method. In the rectangular control, a modulation percentage of a voltage conversion (a value corresponding to a ratio of an output voltage to an input voltage) is larger than that obtained in the PWM control, and therefore a motor output can be increased. However, a control accuracy (a control response) tends to be poor, leading to instability in an inverter output voltage. Therefore, the rectangular control is typically used only in a high vehicle speed region, while the PWM control is used under normal speed region which is lower than the high vehicle speed region.

During the battery-less travel control, meanwhile, the battery cannot be used as a power buffer, and therefore an accurate electric power balance must be achieved between the motor and the generator. When the vehicle speed reaches to a high vehicle speed region during the battery-less travel control, however, the inverter control method shifts from the PWM control to the rectangular control exhibiting poor control precision. Accordingly, the power balance may collapse when a required driving force varies rapidly, and as a result, a voltage (the inverter output voltage) applied to the motor may become unstable.

SUMMARY OF THE INVENTION

The invention has been designed to solve the problem described above, and an object thereof is to suppress instability in a voltage applied to a motor during battery-less travel control.

A vehicle according to a first aspect of the invention is caused to travel by rotating an output shaft coupled to a drive wheel using power from at least one of an engine and a motor, and includes: a generator that generates electric power using the power of the engine; a battery configured to be connectable to the motor and the generator; and a control apparatus that controls the motor and the generator. The control apparatus drives the motor through pulse width modulation control when a vehicle speed is lower than a threshold and drives the motor through rectangular control in which the motor can output a larger torque but poor controllability in comparison with the pulse width modulation control, when the vehicle speed exceeds the threshold. The control apparatus performs battery-less travel control in which the battery is disconnected from the motor and the generator and the motor is driven using the power generated by the generator when an abnormality occurs in the battery. During the battery-less travel control, the control apparatus suppresses execution of the rectangular control by implementing a vehicle speed limitation.

During the battery-less travel control, the control apparatus may control the vehicle speed to be at or below a limit value corresponding to the threshold.

The vehicle may further include a transmission provided between the motor and the output shaft. The control apparatus may modify the limit value in accordance with a speed ratio of the transmission.

The gear speed of the transmission may be set to either a low speed position or a high speed position having a smaller speed ratio than the low speed position. The control apparatus may control the threshold and the limit value to be larger when the gear speed is set at the high speed position than when the gear speed is set at the low speed position.

The control apparatus may limit the vehicle speed by limiting a torque of the engine or the motor.

The vehicle may further include a planetary gear apparatus that includes a ring gear coupled to the motor, a sun gear coupled to the generator, a pinion gear engaged to the sun gear and the ring gear, and a carrier that is coupled to the engine and supports the pinion gear rotatably.

A vehicle control method according to a second aspect of the invention is a control method for a vehicle that is caused to travel by rotating an output shaft coupled to a drive wheel using power from at least one of an engine and a motor. The vehicle includes: a generator that generates power using the power of the engine; a battery configured to be connectable to the motor and the generator; and a control apparatus that controls the motor and the generator. The control method includes the steps of: driving the motor through pulse width modulation control when a vehicle speed is lower than a threshold, and driving the motor through rectangular control in which the motor can output a larger torque but poor controllability in comparison with the pulse width modulation control, when the vehicle speed exceeds the threshold; performing battery-less travel control in which the battery is disconnected from the motor and the generator and the motor is driven using the power generated by the generator when an abnormality occurs in the battery; and suppressing execution of the rectangular control during the battery-less travel control by implementing a vehicle speed limitation.

According to these aspects of the invention, instability in a voltage, applied to the motor during the battery-less travel control can be suppressed.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 4 is a schematic diagram illustrating control modes of the second MG;

FIG. 5 is a first view showing a correspondence relationship between a vehicle operating point and the control mode of the second MG;

DETAILED DESCRIPTION OF EMBODIMENTS

Embodiments of the invention will be described below with reference to the drawings. In the following description, identical reference symbols have been allocated to identical components. Names and functions thereof are also identical. Accordingly, detailed description thereof will not be repeated.

First Embodiment

Figure 1:
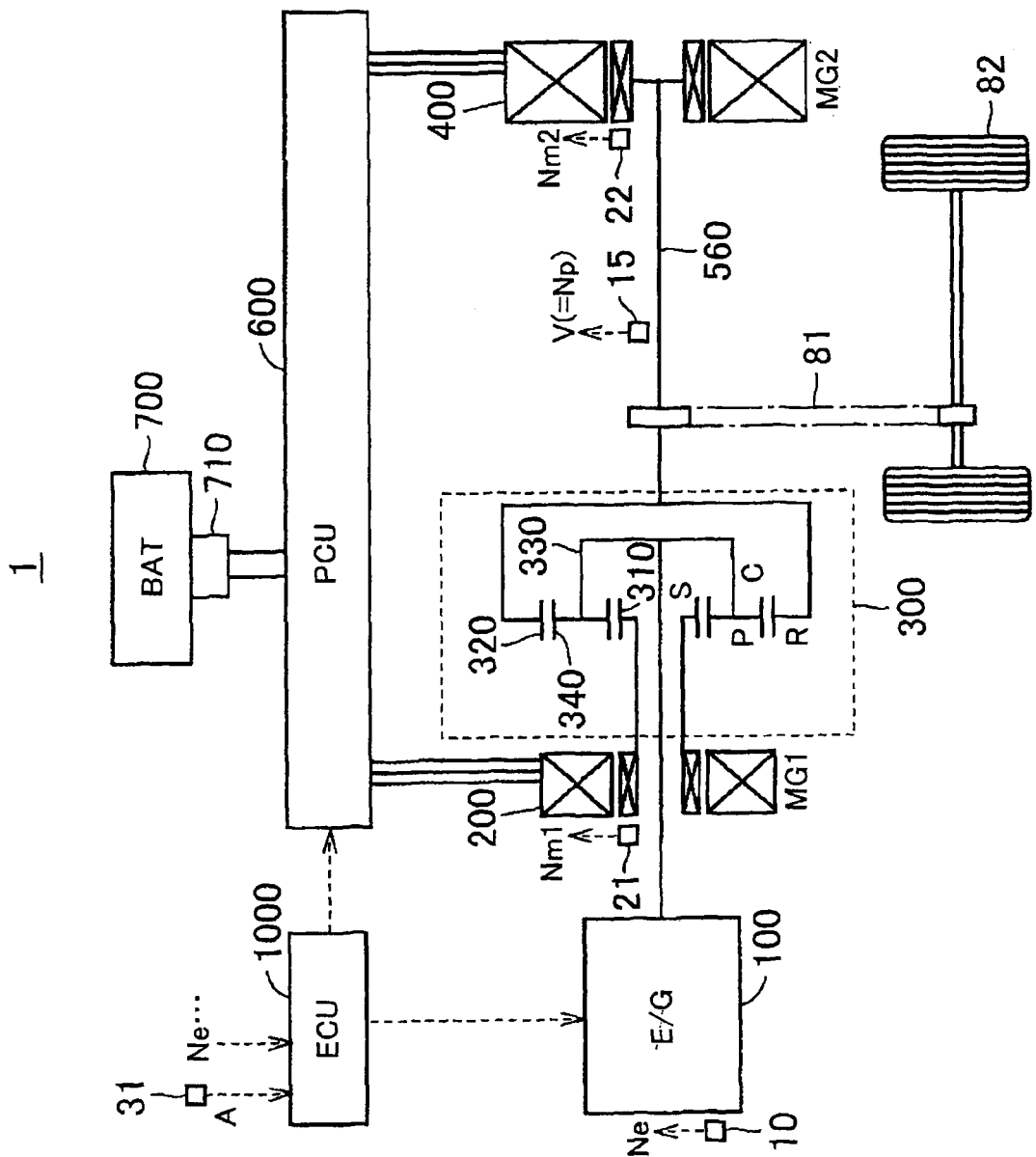
FIG. 1 is a first overall block diagram of a vehicle.

FIG. 1 is an overall block diagram of a vehicle 1 according to this embodiment. The vehicle 1 includes an engine 100, a first MG 200, a power distribution mechanism 300, a second MG 400, a propeller shaft (output shaft) 560, a power control unit (PCU) 600, a battery 700, a system main relay (SMR) 710, and an ECU 1000.

The engine 100 is an internal combustion engine that outputs power by burning a fuel. The power of the engine 100 is input into the power distribution mechanism 300.

The power distribution mechanism 300 divides the power input from the engine 100 into power for the output shaft 560 and power for the first MG 200.

The power distribution mechanism 300 is a planetary gear mechanism having a sun gear (S) 310, a ring gear (R) 320, a pinion gear (P) 340 meshed to the sun gear (S) 310 and the ring gear (R) 320, and a carrier (C) 330 that holds the pinion gear (P) 340 to be free to rotate and revolve.

The carrier (C) 330 is coupled to a crankshaft of the engine 100. The sun gear (S) 310 is coupled to a rotor of the first MG 200. The ring gear (R) 320 is coupled to the output shaft 560.

The first MG 200 and the second MG 400 are alternating current rotating electric machines that respectively function as both a motor and a generator. A rotor of the second MG 400 is coupled to the output shaft 560.

The output shaft 560 is rotated by at least one of the power of the engine 100, which is transmitted thereto via the power distribution mechanism 300, and the power of the second MG 400. A rotary force of the output shaft 560 is transmitted to left and right drive wheels 82 via a reduction gear 81. As a result, the vehicle 1 is caused to travel.

Figure 2:
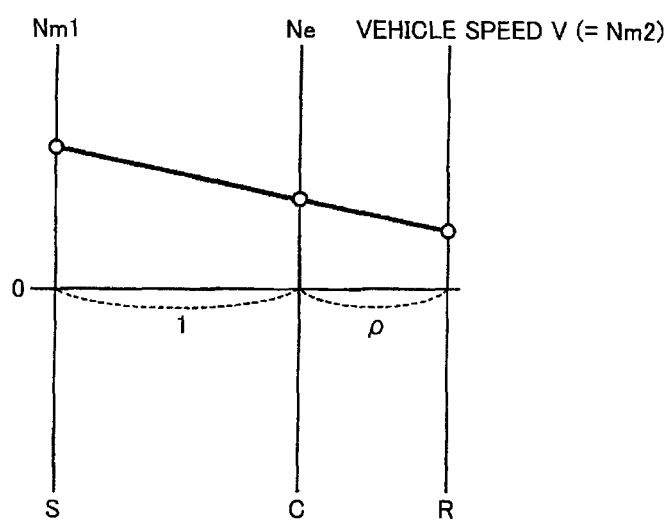
FIG. 2 is a collinear diagram showing a power distribution mechanism.

FIG. 2 is a collinear diagram showing the power distribution mechanism 300. By configuring the power distribution mechanism 300 as described above, a rotation speed of the sun gear (S) 310 (=a first MG rotation speed Nm1), a rotation speed of the carrier (C) 330 (=an engine rotation speed Ne), and a rotation speed of the ring gear (R) 320 (=a second MG rotation speed Nm2, or in other words a vehicle speed V) have a relationship (a relationship according to which, when any two of the rotation speeds are determined, the remaining rotation speed is also determined) indicated by linked straight lines on the collinear diagram of the power distribution mechanism 300.

Returning to FIG. 1, the PCU 600 converts high voltage direct current power supplied from the battery 700 into alternating current power and outputs the alternating current power to the first MG 200 and/or the second MG 400. As a result, the first MG 200 and/or the second MG 400 are driven. Further, the PCU 600 converts alternating current power generated by the first MG 200 and/or the second MG 400 into direct current power and outputs the direct current power to the battery 700. As a result, the battery 700 is charged.

The battery 700 is a secondary battery that stores high voltage (approximately 200 V, for example) direct current power for driving the first MG 200 and/or the second MG 400. The battery 700 is typically configured to include nickel hydrogen or lithium ions. Note that a large capacity capacitor may be employed instead of the battery 700.

The SMR 710 is a relay for switching a connection condition between the battery 700 and an electrical system including the PCU 600.

An engine rotation speed sensor 10, an output shaft rotation speed sensor 15, resolvers 21, 22, an accelerator position sensor 31, and so on are connected to the ECU 1000. The engine rotation speed sensor 10 detects the engine rotation speed Ne (the rotation speed of the engine 100). The output shaft rotation speed sensor 15 detects a rotation speed Np of the output shaft 560 as the vehicle speed V. The resolvers 21, 22 detect the first MG rotation speed Nm1 (the rotation speed of the first MG 200) and the second MG rotation speed Nm2 (the rotation speed of the second MG 400), respectively. The accelerator position sensor 31 detects an accelerator pedal operation amount A (an amount by which an accelerator pedal is operated by a user). The respective sensors output detection results to the ECU 1000.

The ECU 1000 has an inbuilt central processing unit (CPU) and an inbuilt memory, not shown in the drawings, and executes predetermined calculation processing on the basis of information stored in the memory and information from the respective sensors. The ECU 1000 controls respective devices installed in the vehicle 1 on the basis of results of the calculation processing.

Figure 3:
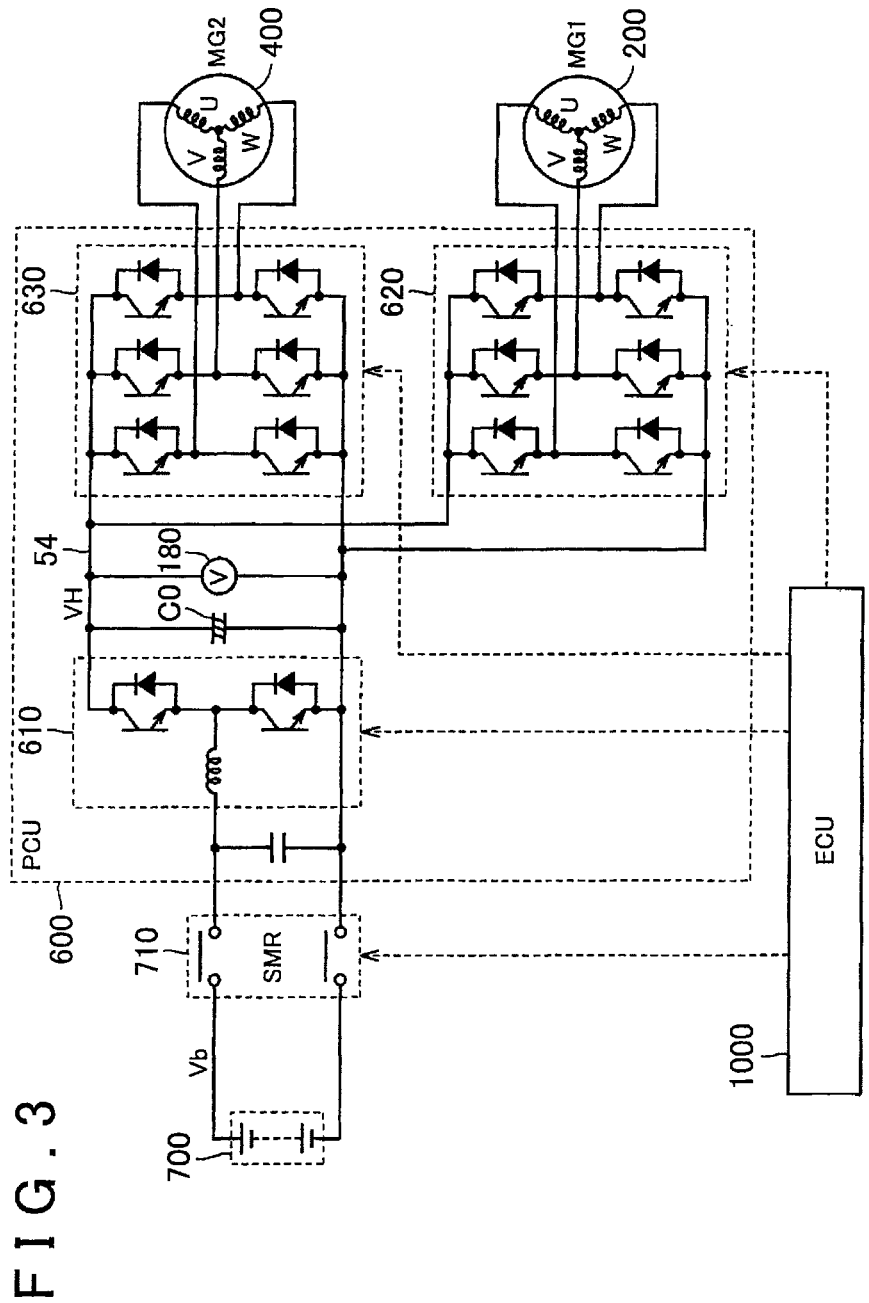
FIG. 3 is a circuit diagram showing an electrical system for drive-controlling a first motor/generator (MG) and a second MG.

FIG. 3 is a circuit diagram showing an electrical system for drive-controlling the first MG 200 and the second MG 400. The electrical system is constituted by the first MG 200, the second MG 400, the PCU 600, the battery 700, the SMR 710, and the ECU 1000.

When the SMR 710 is OFF, the battery 700 is disconnected from the electrical system. When the SMR 710 is ON, the battery 700 is connected to the electrical system. The SMR 710 is controlled (switched ON and OFF) in response to control signals from the ECU 1000. For example, when the user performs an operation to start driving such that a request is issued to activate the electrical system, the ECU 1000 switches the SMR 710 ON.

The PCU 600 includes a converter 610 and inverters 620, 630. The converter 610 has a typical boost chopper circuit configuration constituted by a reactor and two switching elements. An anti-parallel diode is connected to each switching element.

The inverters 620, 630 are connected in parallel to the converter 610. The inverter 620 is connected between the converter 610 and the first MG 200. The inverter 620 includes a U phase arm, a V phase arm, and a W phase arm. The U phase arm, the V phase arm, and the W phase arm are connected in parallel. The U phase arm, the V phase arm, and the W phase arm respectively include two switching elements (an upper arm and a lower arm) connected in series. Each switching element is provided with an anti-parallel diode.

The inverter 630 is connected between the converter 610 and the second MG 400. Similarly to the inverter 620, the inverter 630 has a typical three-phase inverter configuration. In other words, the inverter 630 includes upper and lower arms for three phases (the U phase, the V phase, and the W phase), and an anti-parallel diode provided on each arm.

A direct current voltage (also referred to as a "system voltage VH" hereafter) on a power line 54 between the converter 610 and the inverters 620, 630 is detected by a voltage sensor 180. A detection result from the voltage sensor 180 is output to the ECU 1000.

The converter 610 executes a bidirectional direct current voltage conversion between the system voltage VH and a voltage Vb of the battery 700. When power discharged from the battery 700 is to be supplied to the first MG 200 or the second MG 400, the voltage is boosted by the converter 610. When, conversely, power generated by the first MG 200 or the second MG 400 is to be charged to the battery 700, the voltage is reduced by the converter 610.

The inverter 620 converts the system voltage VH into an alternating current voltage by switching the switching elements ON and OFF. The converted alternating current voltage is supplied to the first MG 200. The inverter 620 also converts alternating current power generated by the first MG 200 into direct current power.

Similarly, the inverter 630 converts the system voltage VH into an alternating current voltage and supplies the alternating current voltage to the second MG 400. The inverter 630 also converts alternating current power generated by the second MG 400 into direct current power.

The power line 54 that electrically connects the converter 610 to the inverters 620, 630 thus serves as a positive electrode bus bar and a negative electrode bus bar shared by the respective inverters 620, 630. The power line 54 is electrically connected to both the first MG 200 and the second MG 400, and therefore power generated by one of the first MG 200 and the second MG 400 can be consumed by the other.

Hence, in a condition where the SMR 710 is ON such that the battery 700 is connected to the electrical system, the battery 700 is charged by power generated by one of the first MG 200 and the second MG 400 and discharges power to make up for a power deficiency therein. Conversely, in a condition where the SMR 710 is OFF such that the battery 700 is disconnected from the electrical system, the battery 700 cannot be used as a power buffer, and therefore a power balance must be achieved between the first MG 200 and the second MG 400.

The ECU 1000 drive-controls the first MG 200 and the second MG 400 by controlling respective switching operations of the inverters 620, 630. More specifically, the ECU 1000 sets a first MG torque command value T1com and a second MG torque command value T2com in accordance with the accelerator pedal amount A and the vehicle speed V, and outputs switching control signals to the inverters 620, 630 so that an actual torque of the first MG 200 and an actual torque of the second MG 400 respectively match the first MG torque command value T1com and the second MG torque command value T2com.

FIG. 4 is a schematic diagram illustrating control modes of the second MG 400 (i.e. control modes of the inverter 630). In the vehicle 1 according to this embodiment, the control mode of the inverter 630 is switched to either a PWM control mode or a rectangular control mode.

In the PWM control mode, either sine wave PWM control or overmodulation PWM control is performed.

Sine wave PWM control is used as a typical PWM control method, in which opening/closing of the switching elements in the arms of the respective phases is controlled in accordance with a voltage comparison between a sine wave-shaped voltage command value and a carrier wave (a carrier signal). As a result, a basic wave component of a line-to-line voltage (also referred to simply as an "inverter output voltage" hereafter) applied to the second MG 400 by the inverter 630 within a fixed time period forms a pseudo-sine wave. As is well recognized, in sine wave PWM control, an amplitude of the basic wave component can only be increased to approximately 0.61 times an inverter input voltage (a modulation percentage can only be increased to 0.61).

Overmodulation PWM control is similar to the sine wave PWM control described above in that an amplitude of the carrier wave is reduced by being distorted. As a result, the modulation percentage can be increased to a range of 0.61 to 0.78.

In the rectangular control mode, meanwhile, rectangular control is performed. In rectangular control, a switching operation is performed once within the aforesaid fixed time period. As a result, the inverter output voltage within the fixed time period forms a rectangular wave voltage corresponding to a single pulse. Accordingly, the rectangular control exhibits poor control precision (control response) in comparison with the PWM control, but the modulation percentage can be increased to 0.78.

Hence, although the rectangular control exhibits poor control precision (control response) in comparison with the PWM control, the modulation percentage can be increased, enabling an increase in motor output.

Taking into consideration these differences in the characteristics of the control modes, the ECU 1000 selects the control mode in accordance with a region to which a vehicle operating point, which is determined by a vehicle driving torque (a driving torque of the output shaft 560) and the vehicle speed V (the rotation speed Np of the output shaft 560, or in other words the second MG rotation speed Nm2), belongs.

FIG. 5 is a view showing a correspondence relationship between the vehicle operating point and the control mode of the second MG 400 (the inverter 630). Basically, the PWM control mode exhibiting comparatively favorable controllability is selected in a region A1 on a low rotation speed side of a control boundary line L in order to reduce torque variation, while the rectangular control mode is selected in a region A2 on a high rotation speed side of the control boundary line L in order to increase the output of the second MG 400. Hereafter, the region A1 and the region A2 will be referred to respectively as a "PWM control region A1" and a "rectangular control region A2".

Next, battery-less travel control will be described. When an abnormality occurs in the battery 700 such that charging and discharging are prohibited, the ECU 1000 performs failsafe control by switching the SMR 710 OFF so that the vehicle 1 is caused to travel in a condition where the battery 700 is disconnected from the electrical system. This failsafe control is "battery-less travel control".

During the battery-less travel control, the battery 700 cannot be used as a power buffer, and therefore a power balance must be achieved between the first MG 200 and the second MG 400. In other words, during the battery-less travel control, the second MG 400 must be driven using the power generated by the first MG 200, and therefore a power generation amount of the first MG 200 and a power consumption amount of the second MG 400 must be controlled to identical values.

Figure 6:
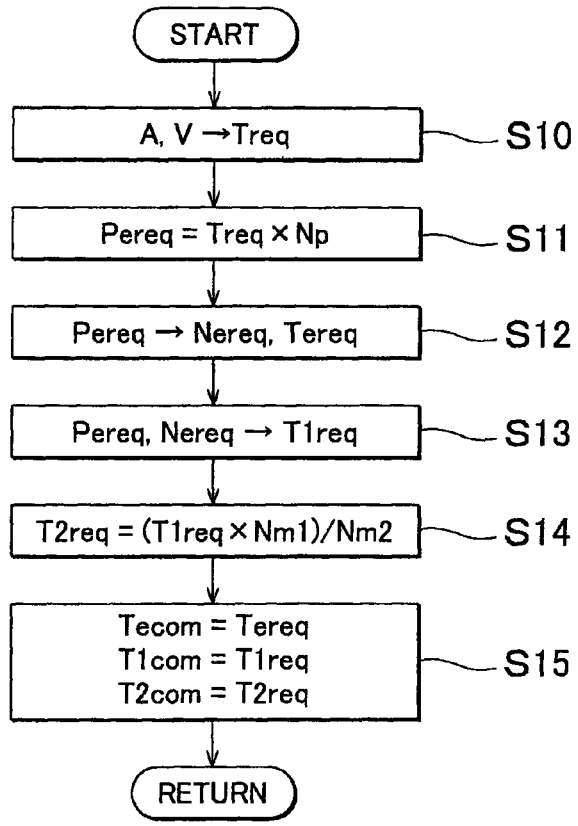
FIG. 6 is a first flowchart showing processing procedures of an electronic control unit (ECU)

FIG. 6 is a flowchart showing processing procedures executed by the ECU 1000 during the battery-less travel control.

In S10, the ECU 1000 calculates a vehicle required torque Treq in accordance with the accelerator pedal amount A and the vehicle speed V. For example, a map defining a correspondence relationship between the vehicle required torque Treq and the accelerator pedal amount A and vehicle speed V is stored in the ECU 1000 in advance, and the ECU 1000 calculates the vehicle required torque Treq corresponding to the actual accelerator pedal amount A and vehicle speed V using the map.

In S11, the ECU 1000 calculates an engine required power Pereq from the vehicle required torque Treq. More specifically, the ECU 1000 calculates a product (=a vehicle required power) of the vehicle required torque Treq and the output shaft rotation speed Np as the engine required power Pereq.

In S12, the ECU 1000 calculates an engine rotation speed target value Nereq and an engine torque target value Tereq for satisfying the engine required power Pereq. For example, an optimum engine operating line determined by the engine rotation speed Ne and an engine torque Te is set in advance in the ECU 1000, and the ECU 1000 calculates the engine rotation speed target value Nereq and the engine torque target value Tereq for satisfying the engine required power Pereq using this optimum engine operating line.

In S13, the ECU 1000 calculates a first MG torque target value T1req for bearing a reaction force of the engine torque Te from the engine required power Pereq and the engine rotation speed target value Nereq. When a planetary gear ratio of the power distribution mechanism 300 is set at "ρ", a relationship of T1=ρ/(1+ρ)×Te is established from a mechanical relationship between a first MG torque T1 and the engine torque Te. The engine torque Te takes a value obtained by dividing an engine power Pe by the engine rotation speed Ne, and therefore the ECU 1000 calculates the first MG torque target value T1req using a following Equation (1).

$$T1req=\rho/(1+\rho)\times Tereq=\rho/(1+\rho)\times(Pereq/Nereq) \quad (1)$$

Note that during the battery-less travel control, the first MG torque target value T1req is set at a negative value (T1req<0) in order to set the first MG 200 in a power generation condition.

In S14, the ECU 1000 calculates a second MG torque target value T2req such that a first MG target power (=a target value of the power generation amount of the first MG 200) and a second MG target power (=a target value of the power consumption amount of the second MG 400) take identical values. More specifically, the ECU 1000 calculates the second MG torque target value T2req using a following Equation (2).

$$T2req=(T1req\times Nm1)/Nm2 \quad (2)$$

In S15, the ECU 1000 sets the calculated engine torque target value Tereq, first MG torque target value T1req, and second MG torque target value T2req at an engine torque command value Tecom, the first MG torque command value T1com, and the second MG torque command value T2com, respectively.

Hence, to achieve a power balance between the first MG 200 and the second MG 400 during the battery-less travel control, the respective torque command values are set such that the power generation amount of the first MG 200 and the power consumption amount of the second MG 400 take identical values. However, when the control mode of the second MG 400 is switched to the rectangular control mode exhibiting comparatively poor controllability, a control precision of a second MG torque T2 deteriorates. Accordingly, the power generation amount of the first MG 200 may not match the power consumption amount of the second MG 400, and as a result, the inverter output voltage may become unstable.

The inverter output voltage becomes particularly unstable in a pattern where the vehicle required power varies rapidly, typically a pattern where the accelerator is switched ON (accelerator pedal operation amount A>0) and OFF (accelerator pedal operation amount A=0) repeatedly at a high vehicle speed. When the accelerator is switched ON, a negative torque of the first MG 200 is increased in order to increase the power generation amount of the first MG 200 (=an output power of the second MG 400). To prevent a reduction in the engine rotation speed Ne caused by the increase in the negative torque of the first MG 200, the engine torque Te is increased. In actuality, however, the engine rotation speed Ne decreases temporarily due to a control delay in the engine 100. This temporary reduction in the engine rotation speed Ne leads to a temporary reduction in the first MG rotation speed Nm1 (see the collinear diagram in FIG. 2). As a result, the power generation amount of the first MG 200 decreases, and therefore the output power of the second MG 400 must be reduced by an amount corresponding to the reduction in the power generation amount of the first MG 200 in order to maintain the power balance. In the rectangular control mode exhibiting comparatively poor controllability, however, a delay occurs during reduction of the output power of the second MG 400, leading to a reduction in the system voltage VH, and as a result, the inverter output voltage decreases. Hence, when the accelerator is switched ON and OFF repeatedly at a high vehicle speed, the inverter output voltage may be reduced repeatedly, leading to instability therein. In a vehicle where a failsafe is implemented to shut down (stop) the inverters 620, 630 when the system voltage VH falls to or below a predetermined value, a reduction in the system voltage VH may render continued vehicle travel impossible.

Hence, in this embodiment, the inverter output voltage is prevented from becoming unstable during the battery-less travel control by incorporating control (more specifically, a vehicle speed limitation) that reduces the likelihood of a shift to the rectangular control during the battery-less travel control. This point is the main feature of this embodiment.

Figure 7:
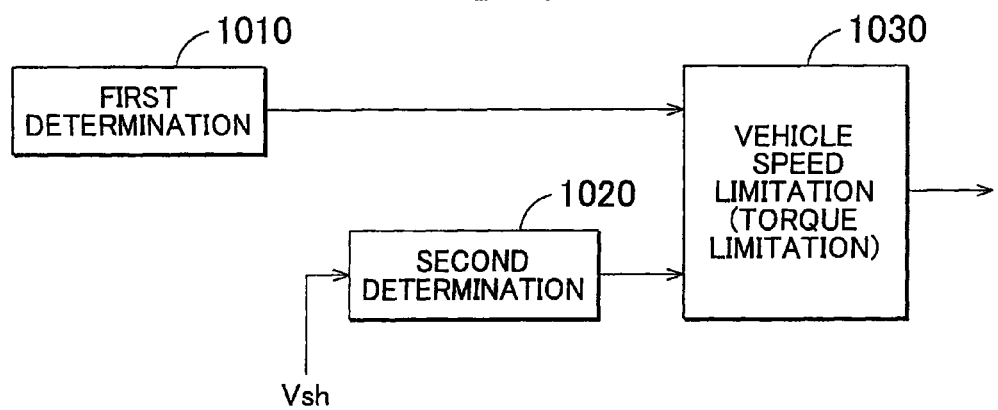
FIG. 7 is a first function block diagram of the ECU.

FIG. 7 is a function block diagram of the ECU 1000 in a case where a vehicle speed limitation is implemented during the battery-less travel control. Respective function blocks shown in FIG. 7 may be realized by hardware or software.

The ECU 1000 includes a first determination unit 1010, a second determination unit 1020, and a vehicle speed limitation unit 1030.

The first determination unit 1010 determines whether or not the battery-less travel control is underway. The second determination unit 1020 determines whether or not the vehicle speed V has exceeded a vehicle speed limit Vsh set in accordance with the control boundary line L (the boundary between the PWM control region A1 and the rectangular control region A2).

Figure 8:
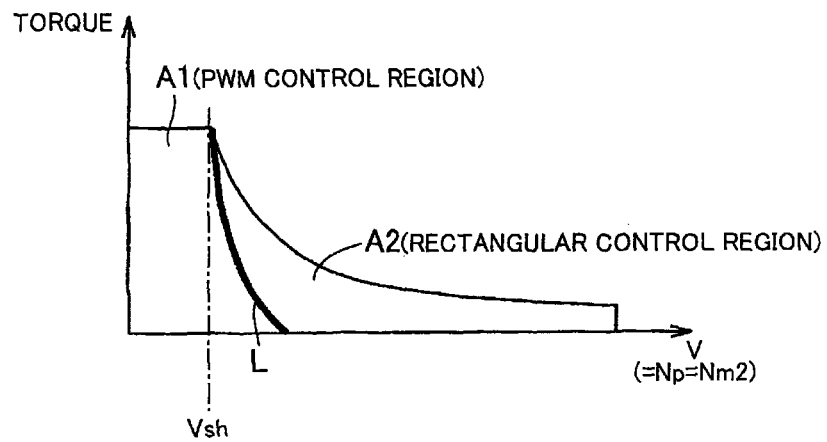
FIG. 8 is a view showing an example of a correspondence relationship between a vehicle speed limit Vsh and a control boundary line L.

FIG. 8 is a view showing an example of a correspondence relationship between the vehicle speed limit Vsh and the control boundary line L. As shown in FIG. 8, the vehicle speed limit Vsh is set at a value on a minimum speed side of the control boundary line L.

The vehicle speed limitation unit 1030 implements a vehicle speed limitation when the vehicle speed V exceeds the vehicle speed limit Vsh during the battery-less travel control. More specifically, the vehicle speed limitation unit 1030 limits the engine torque Te or the second MG torque T2 so that the vehicle speed V falls below the vehicle speed limit Vsh.

Figure 9:
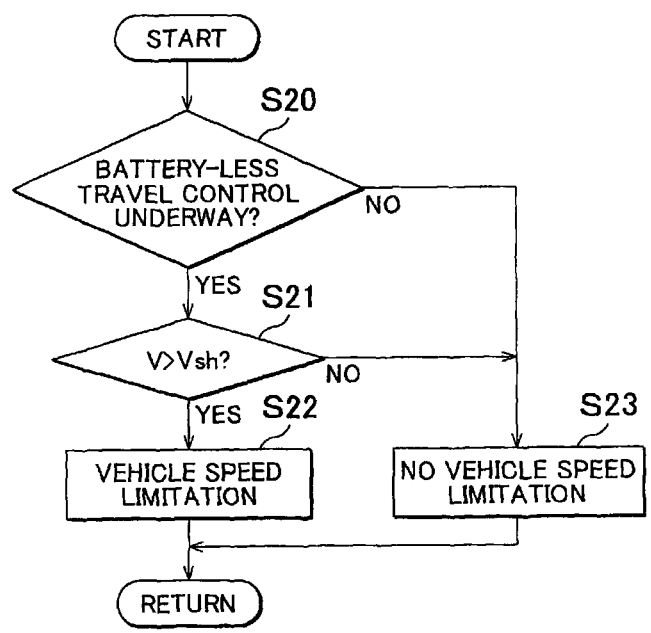
FIG. 9 is a second flowchart showing processing procedures of the ECU.

FIG. 9 is a flowchart showing processing procedures executed by the ECU 1000 to realize the functions described above.

In S20, the ECU 1000 determines whether or not the battery-less travel control is underway. When the battery-less travel control is underway (YES in S20), the processing is advanced to S21. When the battery-less travel control is not underway (NO in S20), the processing is advanced to S23.

In S21, the ECU 1000 determines whether or not the vehicle speed V has exceeded the vehicle speed limit Vsh. When the vehicle speed V exceeds the vehicle speed limit Vsh (YES in S21), the processing is advanced to S22. When the vehicle speed V does not exceed the vehicle speed limit Vsh (NO in S21), the processing is advanced to S23.

In S22, the ECU 1000 implements the vehicle speed limitation. In other words, the ECU 1000 limits the engine torque Te or the second MG torque T2 so that the vehicle speed V falls below the vehicle speed limit Vsh.

In S23, the ECU 1000 does not implement the vehicle speed limitation. In other words, the ECU 1000 does not limit the engine torque Te or the second MG torque T2.

Hence, in this embodiment, by implementing the vehicle speed limitation during the battery-less travel control, the likelihood of shifting to the rectangular control during the battery-less travel control is reduced. Accordingly, instability in the inverter output voltage during the battery-less travel control can be suppressed, and as a result, the vehicle can travel to a safety area.

Second Embodiment

Figure 10:
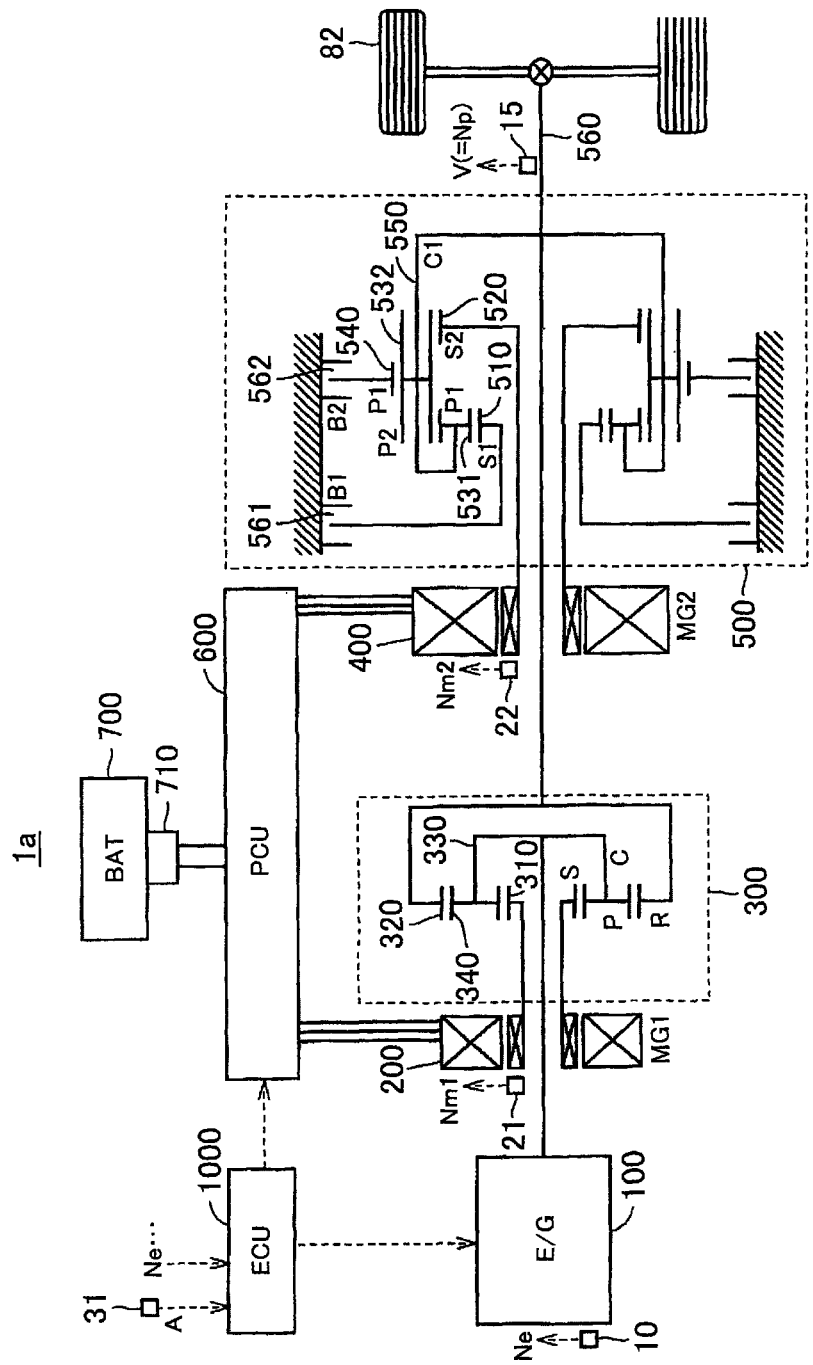
FIG. 10 is a second overall block diagram of the vehicle.

FIG. 10 is an overall block diagram of a vehicle 1a according to this embodiment. The vehicle 1a differs from the vehicle 1 shown in FIG. 1 in that a transmission 500 is provided between the second MG 400 and the output shaft 560. All other structures are identical to the vehicle 1 shown in FIG. 1, and therefore detailed description thereof will not be repeated.

The transmission 500 shifts the rotation speed of the second MG 400 and transmits the shifted rotation to the output shaft 560. The transmission 500 is constituted by a set of Ravigneaux planetary gear mechanisms. More specifically, the transmission 500 includes a first sun gear (S1) 510, a second sun gear (S2) 520, a first pinion (P1) 531 meshed to the first sun gear (S1) 510, a second pinion (P2) 532 meshed to the first pinion (P1) 531 and the second sun gear (S2) 520, a ring gear (R1) 540 meshed to the second pinion (P2) 532, and a carrier (C1) 550 that holds the respective pinions 531, 532 to be free to rotate and revolve. Hence, the first sun gear (S1) 510 and the ring gear (R1) 540 constitute, together with the respective pinions 531, 532, a mechanism corresponding to a double pinion planetary gear mechanism, while the second sun gear (S2) 520 and the ring gear (R1) 540 constitute, together with the second pinion (P2) 532, a mechanism corresponding to a single pinion planetary gear mechanism.

The carrier (C1) 550 is coupled to the output shaft 560. The second sun gear (S2) 520 is coupled to the rotor of the second MG 400.

The transmission 500 is further provided with a B1 brake 561 that fixes the first sun gear (S1) 510 selectively and a B2 brake 562 that fixes the ring gear (R1) 540 selectively.

The B1 brake 561 generates an engagement force from a frictional force between a friction material fixed to a case side of the transmission 500 and a friction material fixed to the first sun gear (S1) 510 side. The B2 brake 562 generates an engagement force from a frictional force between the friction material fixed to the case side of the transmission 500 and a friction material fixed to the ring gear (R1) 540 side. The brakes 561, 562 are connected to a speed changing hydraulic circuit (not shown) that outputs oil pressure corresponding to a control signal from the ECU 1000, and are engaged and disengaged by the oil pressure output from the speed changing hydraulic circuit.

When the B1 brake 561 is engaged such that the first sun gear (S1) 510 is fixed and the B2 brake 562 is disengaged such that the ring gear (R1) 540 is not fixed, a speed position of the transmission 500 is set in a high speed position Hi. When the B2 brake 562 is engaged such that the ring gear (R1) 540 is fixed and the B1 brake 561 is disengaged such that the first sun gear (S1) 510 is not fixed, on the other hand, the speed position of the transmission 500 is set in a low speed position Lo having a larger speed ratio than the high speed position Hi. Note that the speed ratio is a ratio of an input shaft rotation speed (=the second MG rotation speed Nm2) to an output shaft rotation speed (=the rotation speed Np of the output shaft 560) of the transmission 500.

The output shaft 560 is rotated by at least one of the power of the engine 100 transmitted via the power distribution mechanism 300 and the power of the second MG 400 transmitted via the transmission 500. The rotary force of the output shaft 560 is transmitted to the left and right drive wheels 82 via the reduction gear. As a result, the vehicle 1a is caused to travel.

Figure 11:
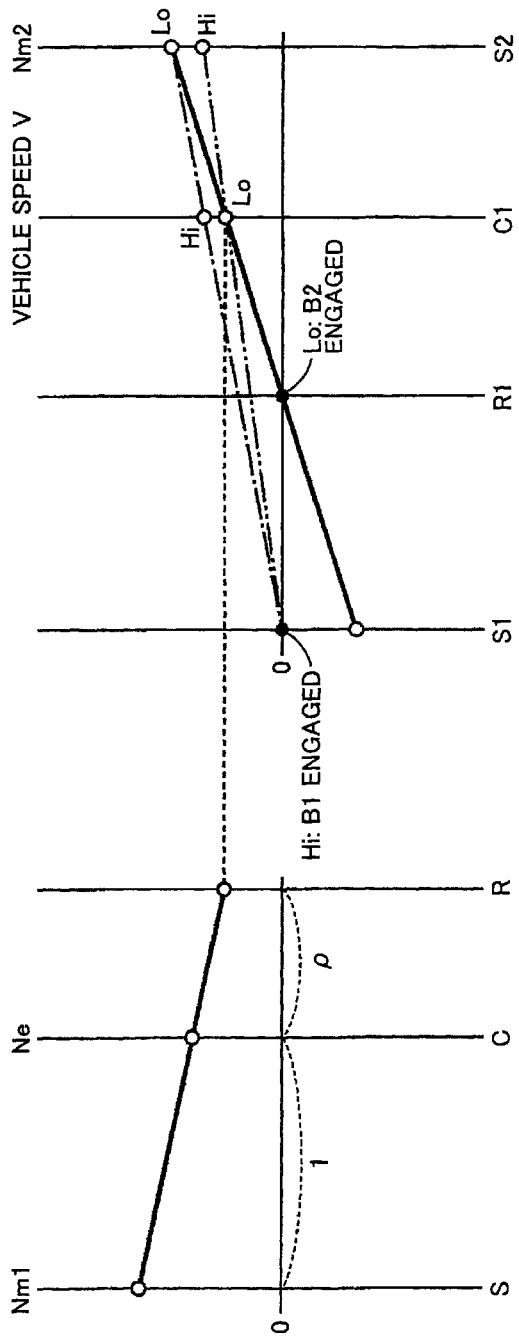
FIG. 11 is a collinear diagram showing the power distribution mechanism and a transmission.

FIG. 11 is a collinear diagram showing the power distribution mechanism 300 and the transmission 500. By configuring the power distribution mechanism 300 as described above, the rotation speed of the sun gear (S) 310 (=the first MG rotation speed Nm1), the rotation speed of the carrier (C) 330 (=the engine rotation speed Ne), and the rotation speed of the ring gear (R) 320 have a relationship (a relationship according to which, when any two of the rotation speeds are determined, the remaining rotation speed is also determined) indicated by linked straight lines on the collinear diagram of the power distribution mechanism 300.

Further, by configuring the transmission 500 as described above, a rotation speed of the first sun gear (S1) 510, a rotation speed of the ring gear (R1) 540, a rotation speed of the carrier (C1) 550, and a rotation speed of the second sun gear (S2) 520 (=the second MG rotation speed Nm2) have a relationship (a relationship according to which, when any two of the rotation speeds are determined, the remaining two rotation speeds are also determined) indicated by linked straight lines on the collinear diagram of the transmission 500.

The carrier (C1) 550 of the transmission 500 is connected to the output shaft 560, and therefore the rotation speed of the carrier (C1) 550 matches the rotation speed of the output shaft 560 (i.e. the vehicle speed V). The ring gear (R) 320 of the power distribution mechanism 300 is also connected to the output shaft 560, and therefore the rotation speed of the ring gear (R) 320 also matches the rotation speed of the output shaft 560 (i.e. the vehicle speed V).

In the low speed position Lo, the B2 brake 562 is engaged such that the ring gear (R1) 540 is fixed, and therefore the rotation speed of the ring gear (R1) 540 is zero. Further, in the high speed position Hi, the B1 brake 561 is engaged such that the first sun gear (S1) 510 is fixed, and therefore the rotation speed of the first sun gear (S1) 510 is zero. Hence, as shown in FIG. 11, when the second MG rotation speed Nm2 is constant, the vehicle speed V during formation of the high speed position Hi is higher than the vehicle speed V during formation of the low speed position Lo in accordance with a relationship between a line of the high speed position Hi (a dot-dash line) and a line of the low speed position Lo (a solid line). Conversely, as shown in FIG. 11, when the vehicle speed V is constant, the second MG rotation speed Nm2 during formation of the high speed position Hi is lower than the second MG rotation speed Nm2 during formation of the low speed position Lo in accordance with a relationship between a line of the high speed position Hi (a dot-dot-dash line) and a line of the low speed position Lo (a solid line).

Figure 12:
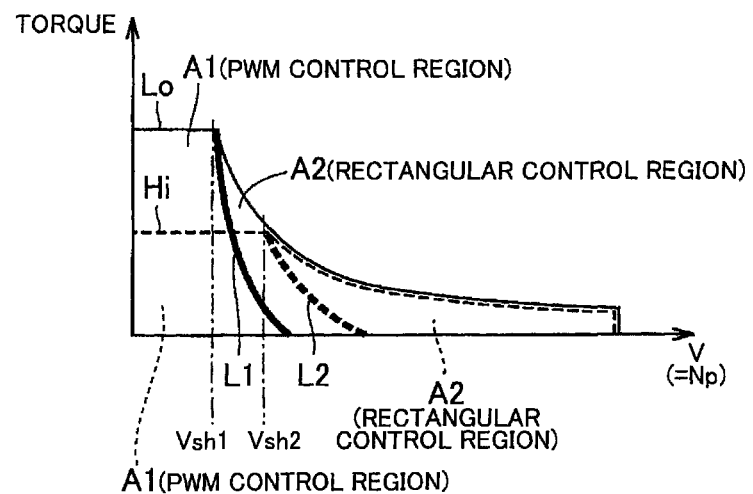
FIG. 12 is a second view showing the correspondence relationship between the vehicle operating point and the control mode of the second MG.

FIG. 12 is a view showing the correspondence relationship between the vehicle operating point and the control mode of the second MG 400 (the inverter 630) according to this embodiment. The correspondence relationship is basically identical to that of the first embodiment described above, but in this embodiment, the control boundary line L is set at different values during formation of the high speed position Hi and the low speed position Lo. More specifically, as shown in FIG. 11, when the vehicle speed V is constant, the second MG rotation speed Nm2 is lower during formation of the high speed position Hi than during formation of the low speed position Lo. Taking this point into consideration, the ECU 1000 sets a control boundary line L2 used during formation of the high speed position Hi on a higher vehicle speed side than a control boundary line L1 used during formation of the low speed position Lo. As a result, the control mode is less likely to shift to the rectangular control mode during formation of the high speed position Hi than during formation of the low speed position Lo.

In this embodiment, in consideration of this point, the "vehicle speed limit Vsh" (=a vehicle speed at which torque limitation is started during the battery-less travel control) is modified in accordance with the speed ratio of the transmission 500. More specifically, as shown in FIG. 12, during formation of the low speed position Lo, the vehicle speed limit Vsh is set at "Vsh1", whereas during formation of the high speed position Hi having a smaller speed ratio than the low speed position Lo, the vehicle speed limit Vsh is set at "Vsh2", which is higher than Vsh1.

As shown in FIG. 12, the vehicle speed limit Vsh1 used during formation of the low speed position Lo is set at a value on a minimum speed side of the control boundary line L1 used during formation of the low speed position Lo. The vehicle speed limit Vsh2 used during formation of the high speed position Hi is set at a value on a minimum speed side of the control boundary line L2 used during formation of the high speed position Hi.

Figure 13:
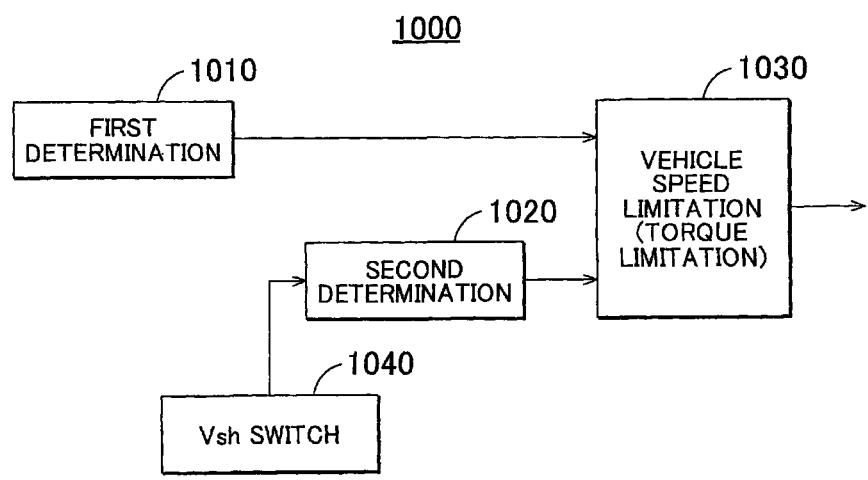
FIG. 13 is a second function block diagram of the ECU.

FIG. 13 is a function block diagram of the ECU 1000 according to this embodiment. The ECU 1000 includes the first determination unit 1010, the second determination unit 1020, the vehicle speed limitation unit 1030, and a switching unit 1040. Note that since the first determination unit 1010, the second determination unit 1020, and the vehicle speed limitation unit 1030 have already been described in the first embodiment using FIG. 7, detailed description thereof will not be repeated here.

When the battery-less travel control is underway, the switching unit 1040 switches the vehicle speed limit Vsh in accordance with the speed position formed by the transmission 500 (the speed ratio of the transmission 500). As described above, the switching unit 1040 sets the vehicle speed limit Vsh at "Vsh1" during formation of the low speed position Lo, and sets the vehicle speed limit Vsh at "Vsh2", which is higher than Vsh1, during formation of the high speed position Hi having a smaller speed ratio than the low speed position Lo.

Figure 14:
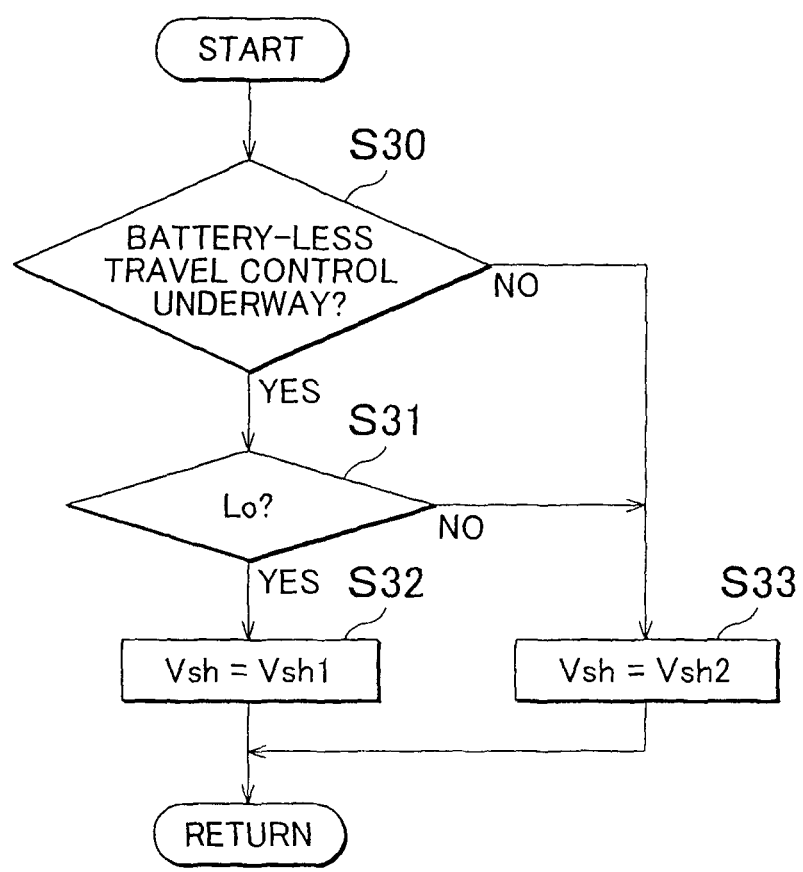
FIG. 14 is a third flowchart showing processing procedures of the ECU.

FIG. 14 is a flowchart showing processing procedures executed by the ECU 1000 to realize the functions of the switching unit 1040.

In S30, the ECU 1000 determines whether or not the battery-less travel control is underway. In S31, the ECU 1000 determines whether or not the speed position formed by the transmission 500 is the low speed position Lo.

When the low speed position Lo is formed (YES in S31), the ECU 1000 sets the vehicle speed limit Vsh at "Vsh1" in S32.

When the high speed position Hi is formed (NO in S31), on the other hand, the ECU 1000 sets the vehicle speed limit Vsh at "Vsh2" in S33.

In this embodiment, as described above, in a case where the low speed position Lo, in which the control mode shifts to the rectangular control at a comparatively low vehicle speed, is formed during the battery-less travel control, the vehicle speed limitation is implemented when the vehicle speed V exceeds comparatively low "Vsh1". In a case where the high speed position Hi, in which the control mode shifts to the rectangular control at a comparatively high vehicle speed, is formed, on the other hand, the vehicle speed limitation is implemented when the vehicle speed V exceeds comparatively high "Vsh2" but not implemented until the vehicle speed V exceeds "Vsh2". Therefore, the likelihood of a shift to the rectangular control during the battery-less travel control can be reduced through the vehicle speed limitation, and at the same time, deterioration of a travel performance of the vehicle due to the vehicle speed limitation can be minimized.

The embodiments disclosed herein are in all respects merely examples and should not be considered limiting. The scope of the invention is illustrated by the claims rather than the above description, and equivalent meanings to the claims and all modifications within the scope are included therein.

The invention claimed is:

1. A vehicle that is caused to travel by rotating an output shaft coupled to a drive wheel using drive power generated by at least one of an engine and a motor, comprising:
   a generator that generates electric power using the power of the engine;
   a battery configured to be connectable to the motor and the generator; and
   a control apparatus programmed to:
      control the motor and the generator,
      determine if a vehicle speed is lower than a threshold,
      if the vehicle speed is lower than the threshold, drive the motor through a pulse width modulation control of an inverter connected to the motor,
      if the vehicle speed is not lower than the threshold, drive the motor through a rectangular control of the inverter, and the motor can provide a larger torque but poor controllability in comparison with the pulse width modulation control,
      determine an abnormality in the battery,
      if the abnormality in the battery is determined, perform a battery-less travel control in which the battery is disconnected from the motor and the generator, and the motor is driven using the electric power generated by the generator, and if the abnormality in the battery is determined and the battery-less travel control is performed, suppress execution of the rectangular control by implementing a vehicle speed limitation.

2. The vehicle according to claim 1, wherein, during the battery-less travel control, the control apparatus is programmed to control the vehicle speed to be at or below a limit value corresponding to the threshold.

3. The vehicle according to claim 2, further comprising a transmission provided between the motor and the output shaft, wherein the control apparatus is programmed to modify the limit value in accordance with a speed ratio of the transmission.

4. The vehicle according to claim 1, wherein the control apparatus is programmed to implement the vehicle speed limitation by limiting a torque of the engine or the motor.

5. The vehicle according to claim 1, further comprising a planetary gear apparatus that includes a ring gear coupled to the motor, a sun gear coupled to the generator, a pinion gear engaged to the sun gear and the ring gear, and a carrier that is coupled to the engine and that supports the pinion gear rotatably.

6. A control method for a vehicle that is caused to travel by rotating an output shaft coupled to a drive wheel using drive power generated by at least one of an engine and a motor, the vehicle including a generator that generates electric power using the power of the engine and a battery configured to be connectable to the motor and the generator, the control method comprising the steps of:
- determining if a vehicle speed is lower than a threshold;
- if the vehicle speed is lower than the threshold, driving the motor through a pulse width modulation control of an inverter connected to the motor;
- if the vehicle speed is not lower than the threshold, driving the motor through a rectangular control of the inverter, and the motor can output a larger torque but poor controllability in comparison with the pulse width modulation control;
- determining an abnormality in the battery;
- if the abnormality in the battery is determined, performing a battery-less travel control in which the battery is disconnected from the motor and the generator, and the motor is driven using the electric power generated by the generator; and
- if the abnormality in the battery is determined and the battery-less travel control is performed, suppressing execution of the rectangular control by implementing a vehicle speed limitation.

7. A vehicle that is caused to travel by rotating an output shaft coupled to a drive wheel using drive power generated by at least one of an engine and a motor, comprising:
- a generator that generates electric power using the power of the engine;
- a battery configured to be connectable to the motor and the generator;
- a transmission provided between the motor and the output shaft, the transmission having a gear speed that can be set to either a low speed position or a high speed position having a smaller speed ratio than the low speed position; and
- a control apparatus programmed to:
  - control the motor and the generator,
  - determine if a vehicle speed is lower than a threshold,
  - if the vehicle speed is lower than the threshold, drive the motor through a pulse width modulation control of an inverter connected to the motor,
  - if the vehicle speed is not lower than the threshold, drive the motor through a rectangular control of the inverter, and the motor can provide a larger torque but poor controllability in comparison with the pulse width modulation control,
  - determine an abnormality in the battery,
  - if the abnormality in the battery is determined, perform a battery-less travel control in which the battery is disconnected from the motor and the generator, and the motor is driven using the electric power generated by the generator,
  - if the abnormality in the battery is determined and the battery-less travel control is performed, suppress execution of the rectangular control by controlling the vehicle speed to be at or below a limit value corresponding to the threshold, and
  - control the threshold and the limit value to be larger when the gear speed is set at the high speed position than when the gear speed is set at the low speed position.

* * * * *

UNITED STATES PATENT AND TRADEMARK OFFICE
CERTIFICATE OF CORRECTION

| | | |
|---|---|---|
| PATENT NO. | : 9,216,664 B2 | Page 1 of 1 |
| APPLICATION NO. | : 14/356665 | |
| DATED | : December 22, 2015 | |
| INVENTOR(S) | : N. Tanaka et al. | |

It is certified that error appears in the above-identified patent and that said Letters Patent is hereby corrected as shown below:

On the title page, at item (71) Applicant, change "KAISHA, Toyota (JP)" to -- KAISHA, Toyota (JP); AISIN AW CO., LTD., Anjo-Shi (JP) --.

On the title page, at item (73) Assignees, change "AISIN AW CO. LTD, Anjo-Shi (JP)" to -- AISIN AW CO., LTD., Anjo-Shi (JP) --.

Signed and Sealed this
Twenty-eighth Day of June, 2016

Michelle K. Lee
*Director of the United States Patent and Trademark Office*